(12) United States Patent
Nakajima et al.

(10) Patent No.: US 8,361,629 B2
(45) Date of Patent: *Jan. 29, 2013

(54) HALF MIRROR AND PROCESS FOR PRODUCING SAME

(75) Inventors: Seiji Nakajima, Kyoto (JP); Tetsuya Mori, Kyoto (JP); Tetsuo Hayase, Kyoto (JP); Keisuke Oomae, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/059,718

(22) PCT Filed: Sep. 10, 2009

(86) PCT No.: PCT/JP2009/004502
§ 371 (c)(1),
(2), (4) Date: Feb. 18, 2011

(87) PCT Pub. No.: WO2010/035415
PCT Pub. Date: Apr. 1, 2010

(65) Prior Publication Data
US 2011/0141568 A1 Jun. 16, 2011

(30) Foreign Application Priority Data
Sep. 26, 2008 (JP) ................ 2008-248738

(51) Int. Cl.
B32B 15/08 (2006.01)
B32B 15/04 (2006.01)
B05D 3/10 (2006.01)
C08G 63/00 (2006.01)

(52) U.S. Cl. ........ 428/457; 428/461; 428/458; 427/341; 427/551; 427/537; 427/256; 427/277; 525/190

(58) Field of Classification Search ......... 428/457, 428/461, 458; 427/341, 551, 537, 256, 277; 525/190
See application file for complete search history.

(56) References Cited

U.S. PATENT DOCUMENTS

| | | |
|---|---|---|
| 2002/0086223 A1 | 7/2002 | Hattori et al. |
| 2002/0094483 A1 | 7/2002 | Hattori et al. |
| 2003/0087119 A1 | 5/2003 | Iwabuchi et al. |
| 2003/0146709 A1 | 8/2003 | Ohta et al. |
| 2003/0149187 A1 | 8/2003 | Kano et al. |
| 2005/0019502 A1 | 1/2005 | Kano et al. |
| 2009/0038957 A1* | 2/2009 | Sakakihara et al. .......... 205/571 |
| 2009/0202850 A1 | 8/2009 | Mori et al. |
| 2010/0215979 A1 | 8/2010 | Nakajima et al. |

FOREIGN PATENT DOCUMENTS

| | | |
|---|---|---|
| CN | 1365135 A | 8/2002 |
| CN | 1405580 A | 3/2003 |
| CN | 101065518 A | 10/2007 |
| JP | 60-238497 A | 11/1985 |
| JP | 7-011449 A | 1/1995 |
| JP | 09-150477 A | 6/1997 |
| JP | 2001-073159 A | 3/2001 |
| JP | 2003-013245 A | 1/2003 |
| JP | 2003-151366 A | 5/2003 |
| JP | 2003-213437 A | 7/2003 |
| JP | 2004-351722 A | 12/2004 |
| JP | 2005248205 A * | 9/2005 |
| JP | 2006-130877 A | 5/2006 |
| JP | 2008-7808 A | 1/2008 |
| WO | WO 2006132241 A1 * | 12/2006 |
| WO | 2008/001611 A1 | 1/2008 |
| WO | WO 2008001611 A1 * | 1/2008 |

OTHER PUBLICATIONS

International Search Report w/translation from PCT/JP2009/004502 dated Nov. 10, 2009 (2 pages).
Written Opinion from PCT/JP2009/004502 dated Nov. 10, 2009 (3 pages).
International Search Report issued in PCT/JP2008/070797, mailed on Feb. 24, 2009 (5 pages).
Written Opinion from PCT/JP2008/070797 dated Feb. 24, 2009 (3 pages).
International Search Report issued in PCT/JP2008/070793, mailed on Feb. 24, 2009 (5 pages).
Written Opinion from PCT/JP2008/070793 dated Feb. 24, 2009 (3 pages).
International Search Report issued in PCT/JP2007/061896, mailed on Sep. 25, 2007 (5 pages).
Written Opinion from PCT/JP2007/061896 dated Sep. 25, 2007 (3 pages).
Patent Abstracts of Japan for Japanese Publication No. 60-238497, publication date Nov. 27, 1985 (1 page).
Chinese Office Action for Application No. 200880105171.3, mailed on Dec. 13, 2011 (6 pages).
Chinese Office Action for Application No. 200880105171.3, mailed on Feb. 24, 2011 (20 pages).
"New Type of Non-Conductive Electroplating NCVM", Pei Chunhua, Xiamen Technology, Issue 5 in 2007, Oct. 15, 2007.
www.iCAx.org, "Ask for the Key Uses of NCVM in the Prior Art", Apr. 15, 2007.
Chinese Office Action for Application No. 200980132045.1, mailed on Mar. 19, 2012 (15 pages).

* cited by examiner

Primary Examiner — Michael M Bernshteyn
(74) Attorney, Agent, or Firm — Osha Liang LLP (57) ABSTRACT

A half mirror has a shape on a substrate and excels in appearance and design and is fabricated by a method. The method includes forming an organic film by applying, onto a transparent substrate or film, a primer composition containing an addition-polymerizable compound having three or more reactive groups, an addition-polymerizable compound having an acidic group, and an addition-polymerizable compound having a hydrophilic functional group, and polymerizing the primer composition. The method includes turning the acidic group into a metal (M1) salt by treating the organic film with an aqueous solution containing metal (M1) ions, and turning the metal (M1) salt into a metal (M2) salt by treating the organic film with a metal (M2) ion aqueous solution containing metal (M2) ions that are lower in ionization tendency than metal (M1) ions, and (d) reducing metal (M2) ions to form a metal film on a surface of the organic film.

7 Claims, 3 Drawing Sheets

HALF MIRROR AND PROCESS FOR PRODUCING SAME

BACKGROUND OF INVENTION

1. Technical Field

One or more embodiments of the present invention relate to half mirrors and methods for fabricating half mirrors and, specifically, to a half mirror small in warpage and excellent in substrate selectivity and design and a method for fabricating such a half mirror.

2. Background Art

Half mirrors, having metallic and thus sophisticated appearances, have been widely used as signs of various types of device, display panels, labels, etc. Such a half mirror fulfills its function as a mirror by reflecting incident light on the one hand but, at the same time, has translucency that allows the back surface thereof to be seen through the front surface thereof and a property that allows any character or picture to be displayed thereon.

In general, a half mirror is fabricated by using a method for forming a metal film on a desired substrate by forming the metal film on a base film by sputtering, deposition, etc. and by then transferring the film onto the substrate by thermocompression bonding (Patent Literature 1).

CITATION LIST

Patent Literature 1

Japanese Patent Application Publication, Tokukai, No. 2004-351722 (Publication Date: Dec. 16, 2004)

SUMMARY OF INVENTION

However, the conventional method of fabrication applies energy such as heat to the substrate and thus, if the substrate used is made of resin, the substrate warps. Further, when the metal film is transferred onto the substrate, the metal film does not detach completely from the base film. This leaves fine pores (hereinafter also called "pin holes") on a surface of the metal film thus transferred. Furthermore, when the substrate and the metal film are bonded by thermocompression with a roller, tilting or the like of a roller may leave streaks on the surface of the metal film in parallel with the direction that the roller rotates, thus impairing the appearance of the half mirror thus formed.

Further, the thermal transfer method for pressure bonding of the metal film to the substrate with the roller of course has great difficulty in forming the metal film on a curved surface, and even sputtering and deposition, which form the metal film directly on the substrate, have great difficulty in forming the metal film on a curved surface; therefore, the metal film thus formed can only be flat. This imposes restrictions on the shape and design of a half mirror that can be fabricated.

Furthermore, the conventional method of fabrication requires printing of a pattern or the like when giving a design to a surface of the half mirror thus formed. However, the pattern (ink) thus printed comes off by friction due to contact with a finger or the like, thus impairing its appearance.

One or more embodiments of the present invention may provide a half mirror that has a given shape on a given substrate and excels in appearance and design and a method for fabricating such a half mirror.

The inventors of the present invention diligently studied a half mirror that has a given shape on a given substrate and excels in appearance and design and a method for fabricating such a half mirror. As a result, they found that use of a chemical reaction in fabrication of a half mirror causes a substrate to warp less and, furthermore, allows fabrication of a half mirror having any shape and design on any substrate, and finally achieved the present invention.

That is, a method for fabricating a half mirror according to one or more embodiments of the present invention includes the steps of: (a) forming an organic film by applying onto a transparent substrate or transparent film a primer composition containing an addition-polymerizable compound having three or more reactive groups, an addition-polymerizable compound having an acidic group, and an addition-polymerizable compound having a hydrophilic functional group, and by then polymerizing the primer composition; (b) turning the acidic group into a metal (M1) salt by treating the organic film with an aqueous solution containing metal (M1) ions; (c) turning the metal (M1) salt into a metal (M2) salt by further treating the organic film with a metal (M2) ion aqueous solution containing metal (M2) ions that are lower in ionization tendency than the metal (M1) ions; and (d) reducing the metal (M2) ions to form a metal film on a surface of the organic film.

An organic film that is formed in the organic film forming step of the method of fabrication according to one or more embodiments of the present invention can take a bulky three-dimensional structure (hereinafter referred to also as "bulky structure") attributable to the addition-polymerizable compound having three or more reactive groups. By taking the bulky structure, the organic film becomes able to fix a large number of metal (M2) ions in a space within the film. Further, it is considered that because, structurally, the organic film allows a reducing agent to permeate into the organic film, the internal metal (M2) ions can be reduced. Therefore, by adjusting the concentration of metal (M2) ions to be fixed, a half mirror having a desired transmittance can be easily fabricated.

Furthermore, the addition-polymerizable compound having a hydrophilic functional group can improve the hydrophilicity of the organic film and, therefore, allows the treating liquids, namely the aqueous solution containing metal (M1) ions, the metal (M2) ions aqueous solution containing metal (M2) ions, and an aqueous solution of the reducing agent, to act into the organic film. This allows the treating liquids to act on the organic film more effectively.

Further, the organic film is ultraviolet curable. Therefore, the method can suppress warpage of a substrate by application of energy such as heat and, therefore, be applied to a substrate or film of low heat resistance. Further, because the broadening of substrate selectivity makes it no longer necessary to use an expensive substrate of high heat resistance, a half mirror can be fabricated more inexpensively.

Furthermore, because the organic film has its acidic group turned into a metal (M1) salt in the metal salt forming step and is treated in the metal fixing step with a metal (M2) ion aqueous solution containing metal (M2) ions that are lower in ionization tendency than the metal (M1) ions, the metal (M2) ions can be efficiently fixed by the difference in ionization tendency between the metal (M1) and the metal (M2). This makes it possible to form a half mirror having any shape on any substrate, e.g., to form a half mirror even on a curved substrate.

According to the method for fabricating a half mirror according to one or more embodiments of the present invention, the organic film may be given raised and depressed parts by applying the primer composition onto the transparent substrate or transparent film by printing or imprinting.

The method according to one or more embodiments of the present invention makes it possible to easily give raised and depressed parts onto the organic film by applying the primer composition in a given shape to a given substrate with use of a simple method such as printing (e.g., ink jet printing, screen printing) or imprinting and by curing the primer composition. By combining flat parts and raised and depressed parts on the organic film, the half mirror can be decorated with a design (e.g., pictures, characters, or the like). That is, in the half mirror thus fabricated, the raised and depressed parts on the organic film serve as parts that represent a given design. The conventional method in which a half mirror surface is subjected to printing has such a defect as peeling off of ink by friction such as finger rubbing. On the other hand, a design formed by the method according to one or more embodiments of the present invention is one formed by raised and depressed parts on an organic film, and the organic film has a metal surface formed on its surface; therefore, the design will not peel off by friction. This makes it possible to easily give a half mirror any design and, moreover, to maintain the design over a long period of time.

According to the method for fabricating a half mirror according to one or more embodiments of the present invention, the acidic group may include a functional group selected from the group consisting of a carboxyl group, a sulfonic acid group, a phenol group, a benzoic acid group, a phthalic acid group, a salicylic acid group, an acetylsalicylic acid group, and a benzenesulfonic acid group.

Because these functional groups are strongly acidic and include electron-withdrawing groups, acidic groups including such functional groups facilitate ion exchange between the metal (M1) ions and the metal (M2) ions and, furthermore, serve as groups to which the metal (M2) is easily fixed. This makes it possible to fabricate a half mirror more efficiently.

According to the method for fabricating a half mirror according to one or more embodiments of the present invention, the reactive groups of the addition-polymerizable compound having three or more reactive groups may include acryloyl groups and/or methacryloyl groups.

Because the acryloyl groups and/or methacryloyl groups are functional groups that easily form a bulky structure, they allow the organic film to be structured such that a larger number of metal ions can be fixed and the reducing agent easily permeates further into the organic film. This makes it possible to reduce the further internal metal (M2) ions.

According to the method for fabricating a half mirror according to one or more embodiments of the present invention, the hydrophilic functional group may include an ethylene oxide group and/or a propylene oxide group.

Ethylene oxide and propylene oxide are superior to other hydrophilic functional groups in ability to improve the hydrophilicity of the organic film and, therefore, allow the treating liquids to act further into the organic film. This allows the treating liquids to act on the organic film further more effectively.

According to the method for fabricating a half mirror according to one or more embodiments of the present invention, the metal (M1) may be potassium or sodium.

According to the foregoing configuration, because potassium and sodium have so high an ionization tendency to differ greatly in ionization tendency from the metal (M2), the metal (M2) can be fixed more easily in the metal fixing step. This makes it possible to fabricate a half mirror more efficiently.

According to the method for fabricating a half mirror according to one or more embodiments of the present invention, the metal (M2) may be one or more types of metal selected from the group consisting of tin, nickel, indium, gold, palladium, and silver.

The foregoing configuration makes it possible to fabricate a half mirror which utilizes the respective characteristic colors of metals to exhibit various appearances. Further, a combination of two or more metals makes it possible to fabricate a half mirror exhibiting a metallic color that cannot be expressed by a single type of metal alone.

According to the method for fabricating a half mirror according to one or more embodiments of the present invention, in the step (d), the metal (M2) ions may be reduced with use of (i) one or more reducing agents selected from the group consisting of (1) ascorbic acid, sodium ascorbate, sodium borohydride, potassium borohydride, dimethylamine borane, trimethylamine borane, citric acid, sodium citrate, tannic acid, diborane, hydrazine, and formaldehyde, (2) derivatives of the compounds (1), and (3) a sulfite salt and hypophosphite and/or (ii) one or more reducing means selected from the group consisting of ultraviolet rays, heat, plasma, and hydrogen.

According to the foregoing configuration, the metal (M2) ions can be reduced with the reducing agent, ultraviolet rays, etc., the metal atoms of the metal (M2) ions can be deposited on the surface of the organic film. This makes it possible to form a predetermined half mirror.

Further, a half mirror according to one or more embodiments of the present invention includes: a transparent substrate or transparent film; an organic film formed on the transparent substrate or transparent film; and a metal particle film formed on the organic film, the metal particle film being composed of metal particles having particle diameters of 10 nm to 100 nm.

According to the foregoing configuration, the half mirror according to one or more embodiments of the present invention includes a transparent substrate or transparent film, an organic film formed on a transparent substrate or transparent film, and a film of an orderly array of fine metal particles formed on the organic film and, therefore, does not have minor unevenness, undulation, or pin holes on its surface as in the case of use of the conventional thermal transfer method. This allows the half mirror according to one or more embodiments of the present invention to exhibit excellent appearance.

The half mirror according to one or more embodiments of the present invention may be configured such that the metal particles be one or more types of metal particles selected from the group consisting of tin, nickel, indium, gold, palladium, and silver.

The foregoing configuration allows the half mirror according to one or more embodiments of the present invention to have the respective characteristic colors of metals or a metallic color that cannot be expressed by a single type of metal alone and, therefore, to exhibit various metallic colors.

The half mirror according to one or more embodiments of the present invention may be configured such that a difference between a maximum distance from a straight line connecting both ends of the transparent substrate or transparent film to the transparent substrate or transparent film in an x-z cross-section of the transparent substrate or transparent film before fabrication of the half mirror and a maximum distance from a straight line connecting both ends of the half mirror to the half mirror in an x-z cross-section of the half mirror be 20 μm or less.

According to the foregoing configuration, the substrate warps less in the fabrication step. This allows the half mirror according to one or more embodiments of the present invention to exhibit excellent appearance.

A half mirror according to one or more embodiments of the present invention is fabricated by a method for fabricating a half mirror according to the one or more embodiments of the present invention.

The method of fabrication makes it possible to form any metal as a film in any shape on any substrate very easily. This makes it possible to provide a half mirror inexpensively. Further, even in the case of use of a resin substrate as a substrate for a half mirror, the half mirror can be provided with suppressed warpage of the substrate.

A half mirror according to one or more embodiments of the present invention has a total transmittance of 10% to 80%.

Because the total transmittance is 10% or greater, part of incident light can be efficiently transmitted; therefore, the half mirror can fulfill its function as a display. Further, because the total transmittance is 80% or less, part of incident light can be efficiently reflected; therefore, therefore, the half mirror can fulfill its function as a mirror. Therefore, the half mirror can sufficiently fulfill its function as a half mirror.

An electronic part or electronic device according to one or more embodiments of the present invention includes a half mirror according to the one or more embodiments of the present invention.

The half mirror is excellent in appearance and design. Therefore, the electronic part according to one or more embodiments of the present invention can exhibit excellent appearance and design.

As described above, a method for fabricating a half mirror according to one or more embodiments of the present invention includes the steps of: (a) forming an organic film by applying onto a transparent substrate or transparent film a primer composition containing an addition-polymerizable compound having three or more reactive groups, an addition-polymerizable compound having an acidic group, and an addition-polymerizable compound having a hydrophilic functional group, and by then polymerizing the primer composition; (b) turning the acidic group into a metal (M1) salt by treating the organic film with an aqueous solution containing metal (M1) ions; (c) turning the metal (M1) salt into a metal (M2) salt by further treating the organic film with a metal (M2) ion aqueous solution containing metal (M2) ions that are lower in ionization tendency than the metal (M1) ions; and (d) reducing the metal (M2) ions to form a metal film on a surface of the organic film.

This brings about an effect of efficiently forming on any substrate a half mirror excellent in appearance and design.

Further, a half mirror according to one or more embodiments of the present invention includes: a transparent substrate or transparent film; an organic film formed on the transparent substrate or transparent film; and a metal particle film formed on the organic film, the metal particle film being composed of metal particles having particle diameters of 10 nm to 100 nm.

This brings about an effect of providing a half mirror which has no unevenness or undulation on its surface, which is uniform, and which is superior in appearance.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

It is noted that the range "A to B" as used herein indicates "A or greater and B or less".

[1. Method for Fabricating a Half Mirror]

In one or more embodiments of the present invention, a method for fabricating a half mirror includes the steps of: (a) forming an organic film by applying onto a transparent substrate or transparent film a primer composition containing an addition-polymerizable compound having three or more reactive groups, an addition-polymerizable compound having an acidic group, and an addition-polymerizable compound having a hydrophilic functional group, and by then polymerizing the primer composition (organic film forming step); (b) turning the acidic group into a metal (M1) salt by treating the organic film with an aqueous solution containing metal (M1) ions (metal salt forming step); (c) turning the metal (M1) salt into a metal (M2) salt by further treating the organic film with a metal (M2) ion aqueous solution containing metal (M2) ions that are lower in ionization tendency than the metal (M1) ions (metal fixing step); and (d) reducing the metal (M2) ions to form a metal film on a surface of the organic film (reducing step). Each of the steps is described below.

(1-1. Organic Film Forming Step)

The organic film forming step is a step of forming an organic film by applying onto a transparent substrate or transparent film a primer composition containing an addition-polymerizable compound having three or more reactive groups, an addition-polymerizable compound having an acidic group, and an addition-polymerizable compound having a hydrophilic functional group, and by then polymerizing the primer composition.

The primer composition serves to form a primer (resin film) on a surface of which the metal (M2) ions to be introduced in the metal fixing step to be described later are deposited so that a predetermined metal film is formed.

The addition-polymerizable compound having three or more reactive groups, the addition-polymerizable compound having an acidic group, and the addition-polymerizable compound having a hydrophilic functional group each have one or more polymerizable unsaturated bonds or, in particular, polymerizable double bonds per molecule. The term "addition-polymerizable compound" as used herein refers to a compound that can be addition-polymerized by active energy such as UV, plasma, or EB, and such a compound may be a monomer, an oligomer, or a polymer.

The "addition-polymerizable compound having three or more reactive groups" is used to give the primer composition a bulky structure. By the primer composition's taking a bulky structure, the organic film is given a bulky three-dimensional structure (bulky structure) attributable to the compound. This allows a large number of metal (M2) ions to be fixed onto the organic film in the metal fixing step to be described later, and also allows the metal (M2) ions to be in a state in which it is easy for them to have contact with a reducing agent, ultraviolet rays, etc.

The term "reactive groups" means addition-polymerizable reactive groups that can be subjected to addition polymerization such as radical polymerization or cationic polymerization. Usable examples of the reactive groups include, but are not to be particularly limited to, acryloyl groups, methacryloyl groups, acrylamide groups, vinyl groups, allyl groups, etc. Among them, acryloyl groups and methacryloyl groups may be used because they are functional groups that easily form a bulky structure. The reactive groups of the addition-polymerizable compound having three or more reactive groups may include acryloyl groups and/or methacryloyl groups.

Further, because the plurality of reactive groups of the addition-polymerizable compound form a branching structure that gives the addition-polymerizable compound a bulky structure, the number of reactive groups are not to be particularly limited so long as it is three or greater.

While the addition-polymerizable compound having three or more reactive groups is not to be particularly limited in structure so long as it has three or more such addition-polymerizable reactive groups per molecule, a possible example of the compound is a compound represented by general formula (1) as follows:

$$(R1-R2)_n\text{---}R3 \quad (1)$$

where n is three or greater, R1 is an addition-polymerizable reactive group selected from the group consisting of an acryloyl group, a methacryloyl group, an acrylamide group, a vinyl group, and an allyl group, R2 is any structure that contains for example an ester group, an alkyl group, an amide group, an ethylene oxide group, a propylene oxide group, etc., R3 is an alkyl group or C—OH.

More specific possible examples of the addition-polymerizable compound having three or more reactive groups include trimethylolpropane triacrylate (marketed, for example, as TMP-A manufactured by KYOEISHA CHEMICAL Co., Ltd.), pentaerythritol triacrylate (marketed, for example, as PE-3A manufactured by KYOEISHA CHEMICAL Co., Ltd.), pentaerythritol tetraacrylate (marketed, for example, as PE-4A manufactured by KYOEISHA CHEMICAL Co., Ltd.), dipentaerythritol hexaacrylate (marketed, for example, as DPE-6A manufactured by KYOEISHA CHEMICAL Co., Ltd.), pentaerythritol triacrylate isophorone diisocyanate urethane prepolymer (marketed, for example, as UA3061 manufactured by KYOEISHA CHEMICAL Co., Ltd.), dipentaerythritol pentaacrylate hexamethylene diisocyanate urethane prepolymer (marketed, for example, as UA-510H manufactured by KYOEISHA CHEMICAL Co., Ltd.), etc.

Further, the "addition-polymerizable compound having three or more reactive groups" used may be of one type alone or a combination of two or more types.

The amount of the "addition-polymerizable compound having three or more reactive groups" that is contained in the primer composition is not to be particularly limited, but may be 1% by weight or greater and 60% by weight or less, or 5% by weight or greater and 50% by weight or less, with respect to the total amount of the primer composition.

An increase in the amount of the addition-polymerizable compound that is contained allows the bulky structure of the addition-polymerizable compound to enhance the effect of fixing of the metal (M2) ions to the primer composition and the effect of reduction of the metal (M2) ions, but leads to a decrease in the proportion of the addition-polymerizable compound having an acidic group and the addition-polymerizable compound having a hydrophilic functional group, thus reducing the effectiveness of these compounds. For this reason, it is desirable that amount of the "addition-polymerizable compound having three or more reactive groups" that is contained in the primer composition be in the above range.

The acidic group of the "addition-polymerizable compound having an acidic group" is not to be particularly limited so long as it can retain metal ions in the form of a salt. Possible examples are a carboxyl group, a sulfonic acid group, a phenol group, a benzoic acid group, a benzenesulfonic acid group, a hydroxyl group, a phthalic acid group, a salicylic acid group, an acetylsalicylic acid group, etc.

The inventors of the present invention found that a strongly acidic group in particular is excellent in ability to carry metal ions and thus very effective in fabricating a metal film. Therefore, the acidic group may be a strongly acidic group. Additionally, as such a strongly acidic group, one or more functional groups selected from the group consisting of a carboxyl group, a sulfonic acid group, a phenol group, a benzoic acid group, a phthalic acid group, a salicylic acid group, an acetylsalicylic acid group, and a benzenesulfonic acid group may be included, because of their excellence in ability to carry metal ions.

It is necessary that at least one acidic group of the "addition-polymerizable compound having an acidic group" be positioned at a molecule end. The "molecule end" may be an end of a principal chain or that of a side chain. Because it is necessary, in the metal salt forming step of one or more embodiments of the present invention, that a metal (M1) ion be trapped by a free acidic acid located at a molecule end of the compound, it is necessary that at least one of the acidic acids be positioned at the molecule end. The acidic group positioned at the molecule end stays as an acidic group in the molecule even after addition polymerization and thus, in the subsequent metal salt forming step, forms the metal (M1) salt by being treated with the aqueous solution containing metal (M1) ions.

An acidic group located at a position other than the molecule end may be in the form of an ester. That is, the "addition-polymerizable compound having an acidic group" may have, at a position other than the molecule end, an ester group obtained from the acidic group. There are no particular limitations on a group that constitutes such an ester group, so long as its ester bond can be hydrolyzed.

Examples of the group that constitutes the ester group include: a straight-chain or branching alkyl group such as a methyl group, an ethyl group, an n-propyl group, an isopropyl group, an n-butyl group, an isobutyl group, a sec-butyl group, or a t-butyl group; an aromatic hydrocarbon group such as a phenyl group; an alicyclic hydrocarbon group such as an isobornyl group or an adamantyl group; a straight-chain or branching perfluoroalkyl group such as a perfluoromethyl group, a perfluoroethyl group, a perfluoro-n-propyl group, a perfluoroisopropyl group, a perfluoro-n-butyl group, a perfluoroisobutyl group, a perfluoro-sec-butyl group, or a perfluoro-t-butyl group; an ether group such as an ethylene oxide group and a propylene oxide group; etc. It is noted that the number of acidic groups or ester groups thereof in a molecule of the "addition-polymerizable compound having an acidic group" is not to be particularly limited.

A possible example of the "addition-polymerizable compound having an acidic group" is a compound represented by general formula (2) or (3) as follows:

$$R1\text{-}R2\text{-}R3\text{-}COOH \quad (2)$$

$$R1\text{-}R2\text{-}R3\text{-}SO_3H \quad (3)$$

where R1 is an addition-polymerizable reactive group selected from the group consisting of an acryloyl group, a methacryloyl group, an acrylamide group, a vinyl group, and an allyl group, R2 is any structure that contains for example an ester group, an alkyl group, an amide group, an ethylene oxide group, a propylene oxide group, etc., R3 is (i) a functional group having a ring structure such as a phenyl group or a cyclohexyl group or (ii) a functional group having a straight-chain structure such as an alkyl group or having a branching structure such as an alkylene group.

More specific examples include: vinylbenzenesulfonic acids; esters thereof, e.g., an acrylic ester having a phthalic acid group, such as 2-acryloyloxyethyl-phthalic acid, an acrylic ester having a salicylic acid group, an acrylic ester having an acetylsalicylic acid group; vinyl phenol; etc.

Further, the "addition-polymerizable compound having an acidic group" used may be of one type alone or a combination of two or more types.

The amount of the "addition-polymerizable compound having an acidic group" that is contained in the primer composition is not to be particularly limited, but may be 10% by weight or greater and 90% by weight or less, or 20% by weight or greater and 80% by weight or less, with respect to the total amount of the primer composition.

An increase in the amount of the "addition-polymerizable compound having an acidic group" that is contained improves the ability of the primer composition to carry metal ions, but leads to a decrease in the amount of the addition-polymerizable compound having three or more reactive groups and the addition-polymerizable compound having a hydrophilic functional group that are contained, thus reducing the effectiveness of these compounds. For this reason, it is desirable that amount of the "addition-polymerizable compound having an acidic group" that is contained be in the above range.

The term "addition-polymerizable compound having a hydrophilic functional group" refers to an addition-polymerizable compound having one or more hydrophilic functional groups per molecule. The term "hydrophilic functional group" means a functional group that has a strong affinity for an aqueous solution. Usable examples of the "hydrophilic functional group" include an ethylene oxide group, a propylene oxide group, an acetal group, a hydroxyl group, and an ether group. Among them, an ethylene oxide group and a propylene oxide group are may be used because they are excellent in ability to improve the hydrophilicity of the organic film. The hydrophilic functional group may include an ethylene oxide group and/or a propylene oxide group.

A possible example of the "addition-polymerizable compound having a hydrophilic functional group" is a compound represented by general formula (4) as follows:

$$R1\text{-}R2\text{-}R1 \quad (4)$$

where R1 is an addition-polymerizable reactive group selected from the group consisting of an acryloyl group, a methacryloyl group, an acrylamide group, a vinyl group, and an allyl group, and R2 is for example a hydrophilic functional group selected from the group consisting of an ethylene oxide group, a propylene oxide group, an acetal group, a hydroxyl group, and an ether group.

More specific examples include polyethylene glycol diacrylate, polypropylene glycol diacrylate, glycerin diacrylate, polytetramethylene glycol diacrylate, 2-hydroxypropyl acrylate, diethylene glycol dimethacrylate, etc.

Further, the "addition-polymerizable compound having a hydrophilic functional group" used may be of one type alone or a combination of two or more types.

The amount of the "addition-polymerizable compound having a hydrophilic functional group" that is contained in the primer composition is not to be particularly limited, but may be 1% by weight or greater and 80% by weight or less, or 5% by weight or greater and 50% by weight or less, with respect to the total amount of the primer composition.

An increase in the amount of the "addition-polymerizable compound having a hydrophilic functional group" that is contained enhance the effect of improving the hydrophilicity of the organic film, but leads to a decrease in the amount of the addition-polymerizable compound having three or more reactive groups and the addition-polymerizable compound having an acidic group that are contained, thus reducing the effectiveness of these compounds. For this reason, it is desirable that amount of the "addition-polymerizable compound having a hydrophilic functional group" that is contained be in the above range.

Because, as described above, the primer composition contains the addition-polymerizable compound having three or more reactive groups, the addition-polymerizable compound having an acidic group, and the addition-polymerizable compound having a hydrophilic functional group, the primer composition is excellent in ability to carry the metal (M2) ions.

The primer composition only needs to contain at least the addition-polymerizable compound having three or more reactive groups, the addition-polymerizable compound having an acidic group, and the addition-polymerizable compound having a hydrophilic functional group, and as such, the primer composition can be prepared by appropriately mixing these compounds by employing a conventionally publicly-known method.

The primer composition may contain a polymerization initiator in addition to the compounds described above. The polymerization initiator is not to be particularly limited so long as it can polymerize the primer composition. Possible examples are a radical polymerization initiator such as a photo polymerization initiator or a thermal polymerization initiator and an ionic polymerization initiator such as a cationic polymerization initiator and an anionic polymerization initiator. Among them, a radical polymerization initiator may be used, or a photo polymerization initiator may be used because it does not require use of heat and thus can be applied to a substrate of low heat resistance.

Examples of the photo polymerization initiator include, but are not to be particularly limited to, 2-hydroxy-2-methyl-1-phenyl-propene-1-on, 2-methyl-1-[4-(methylthio)phenyl]-2-morpholinopropene-1-on, 2,4,6-trimethylbenzoyl-diphenyl-phosphine oxide, triphenyl sulfonyl triflate, etc.

Examples of the thermal polymerization initiator include, but are not to be particularly limited to, cumene hydroperoxide, t-butyl hydroperoxide, benzoyl peroxide, DBU, ethylene diamine, N,N-dimethylbenzylamine, etc. It is noted that these polymerization initiators can be used alone or appropriately in combination.

The amount of the polymerization initiator that is contained is 0.05% by weight and 10% by weight, or in another embodiment of the present invention the amount of the polymerization initiator may be 0.1% by weight and 8% by weight, with respect to the total amount of the primer composition.

The primer composition may contain an addition-polymerizable compound other than the addition-polymerizable compound having three or more reactive groups, the addition-polymerizable compound having an acidic group, and the addition-polymerizable compound having a hydrophilic functional group (such an addition-polymerizable compound being hereinafter referred to as "another addition-polymerizable compound"). The "another addition-polymerizable compound" is a compound that does not have an acidic group or an ester thereof and has one polymerization unsaturated bond or, in particular, polymerizable double bond per molecule. Possible examples are styrene, vinyl cyclohexane, etc. The amount of the "another addition-polymerizable compound" that is contained may be 50% by weight or less, with respect to the total amount of the primer composition. According to another embodiment of the present invention, the amount of the "another addition-polymerizable compound" may be 30% by weight or less, with respect to the total amount of the primer composition.

The primer composition may further contain an organic solvent. Inclusion of the organic solvent improves the applicability of the primer composition onto the substrate or film. Usable examples of the organic solvent include, but are not to be particularly limited to, propylene glycol monomethyl ether acetate, propylene glycol monomethyl ether, cyclohexanone, butyl acetate, etc. The amount of the organic solvent that is contained may be 80% by weight or less, with respect to the total amount of the primer composition. According to another embodiment of the present invention, the amount of the organic solvent that is contained may be 30% by weight or less, with respect to the total amount of the primer composition.

The substrate or film onto which the primer composition is applied needs to be transparent to fully bring out translucency of the half mirror, but is not particularly limited so long as it is transparent; and it is possible to use any substrate or film as such. That is, the primer composition can be cured with ultraviolet rays or the like, and because all the steps of the method for fabricating a half mirror according to one or more embodiments of the present invention can be carried out as a low-temperature process (40° C. to 50° C.) and it is not necessary to apply heat or energy to the substrate as in the case of sputtering or of the thermal transfer method, the method for fabricating a half mirror according to one or more embodiments of the present invention is sufficiently applicable to a substrate or film of low heat resistance.

Examples of the transparent substrate or transparent film include: a substrate or film made of acrylic resin, polyester resin, polycarbonate resin, polyethylene terephthalate, or epoxy resin; a glass substrate, a quartz substrate, a borosilicate glass substrate, etc.

It is noted that the term "transparent" means a total transmittance of 20% or greater.

A method for applying the primer composition onto the substrate or film is not to be particularly limited, but can be any method of application. Possible examples are printing, imprinting, spin coating, spray coating, dip coating, etc.

In particular, when it is desired to give the surface of the organic film a design using depressed and raised parts in the organic film forming step of one or more embodiments of the present invention, the primer composition may be applied onto the transparent substrate or transparent film by printing or imprinting. By polymerizing the primer composition after applying it by printing or imprinting, the organic film can be freely given a design such as characters or pictures using depressed and raised parts. Further, because a metal film can be formed on the surface of the organic film by the metal salt forming step, the metal fixing step, and the reducing step that are to be described later, the design does not come off by friction, unlike in the case of the method (Patent Literature 1) for printing on a surface of a half mirror.

Further, the method according to one or more embodiments of the present invention makes it possible to easily form the metal film even on a curved surface. This makes it possible to form, not only on a planar substrate but also on a substrate of any shape, a half mirror having a given design that does not peels off.

Application of the primer composition makes it easier to give a desired design such as pictures or characters.

The "printing" here may be, but is not to be particularly limited to, ink jet printing, screen printing, or gravure printing. Ink jet printing is a method that prints characters, drawings, etc. by injecting fine droplets of ink through narrow nozzles while controlling the droplets with electrical signals. Unlike the other printing methods, ink jet printing does not require preparation of a press plate and thus facilitates printing.

Further, screen printing is a type of stencil printing method that cuts out microscopic pores in a plate including a frame and a gauze made of synthetic fibers or stainless steel wires stretched across the frame and extruding ink through the microscopic pores. Screen printing allows thick-film printing (10 μm to 30 μm) and gives a three-dimensional appearance to printed elements. Further, screen printing is not limited in material or shape of a printing surface, thus allowing a wide range of printing.

Further, gravure printing is a type of intaglio printing method that makes thicker or thinner layers of ink according to the depths of reticulated depressions on the plate surface and reproduces the tone of a photograph, a painting, etc. by transferring the layers of ink onto a printing surface. Gravure printing can give fine graded effect and thus is suitable to printing photographic images. Further, gravure printing is suitable to high-speed mass rotary printing.

Further, imprinting is a method in which raised and depressed parts, engraved in a mold (hereinafter referred to also as "stamper"), whose dimensions are several tens of nanometers to several hundreds of nanometers are pressed against a resin material applied onto a substrate, so that the shapes of the raised and depressed parts are transferred onto the resin material.

It is noted that it is, of course, possible to obtain a half mirror on which a desired pattern has been formed by a photolithographic method. For example, by polymerizing the primer composition through ultraviolet irradiation with a mask and then removing an unreacted monomer region, an organic film having a pattern shape corresponding to the mask can be formed. Moreover, by subjecting the resulting organic film to the steps to be described later, a half mirror having a three-dimensional pattern shape can be formed. It is noted that the unreacted monomer region can be removed by strong acid such as hydrochloric acid, nitric acid, or sulfuric acid.

It is possible to use one of these methods of application alone or two or more of them in combination.

Alternatively, by applying hard coat resin or the like to the organic film, which has been obtained by polymerizing the primer composition, into desired shapes such as characters or pictures and subjecting the organic film to the metal salt forming step, the metal fixing step, and the reducing step that are to be described later, a half mirror can be given characters, pictures, etc. and the design can be prevented from coming off by friction.

The thickness of the primer composition that is applied is not to be particularly limited and, for example, suitably falls within such a range that the thickness of the organic film after polymerization falls within a range to be mentioned later.

The polymerization can be carried out with use of a polymerization initiator or activation energy beams such as radioactive rays, electron rays, ultraviolet rays, or electromagnetic beams. For example, in the case of use of a photo polymerization initiator, it is only necessary to irradiate the surface to be coated of the substrate or film with light of a wavelength that the photo polymerization initiator absorbs so that a radical can be formed, e.g., with ultraviolet rays.

Alternatively, for example, in the case of use of a thermal polymerization initiator, an increase in temperature is produced up to a temperature at which the thermal polymerization initiator is decomposed so that a radical can be formed, e.g., up to 50° C. to 150° C.

The polymerization forms the organic film on the transparent substrate or transparent film. The thickness of the resulting organic film is not to be particularly limited, and may be, for example 0.1 μm to 1,000 μm, or particular suitably 10 μm to 500 μm.

(1-2. Metal Salt Forming Step)

The metal salt forming step is a step of turning the acidic group into a metal (M1) salt by treating the organic film with an aqueous solution containing metal (M1) ions. The treatment can be easily implemented, for example, by dipping the substrate or film formed with the organic film in the aqueous solution containing metal (M1) ions or by applying the aqueous solution containing metal (M1) ions to the substrate or film formed with the organic film.

The metal (M1) ions are metal ions that, in the metal fixing step to be described later, can exchange cations with metal (M2) ions that are used for forming a metal film. That is, the metal (M1) ions are metal ions that are higher in ionization tendency than the metal (M2) ions. The metal (M1) ions are not to be particularly limited so long as they are metal ions that can exchange cations with the metal (M2) ions. Possible examples are alkali metal ions and alkali earth metal ions. Among them, from the point of view of ease of such cation exchange, the metal (M1) ions may be alkali metal ions, or potassium ions or sodium ions.

It is noted that the term "ionization tendency" as used herein means the tendency of a metal to turn into metal ions (positive ions) when in contact with water, and the level of ionization tendency of metal ions is based on the level of tendency of a metal to turn into those metal ions.

Examples of the aqueous solution containing metal (M1) ions include an aqueous solution of potassium hydroxide, an aqueous solution of sodium hydroxide, etc. The concentration of the metal ions (M1) in such an aqueous solution is not to be particularly limited so long as an acid group turns into a metal salt. However, in one or more embodiments of the present invention, it is possible to turn an acid group into a metal salt efficiently even at a comparatively low concentration of 0.1 M to 5 M, or in another embodiment of the present invention, may be 0.5 M to 2.5 M. It is noted that one or more embodiments of the present invention is not intended to discourage use of two or more types of metal (M1) ions, and in the case of use of two or more types of metal (M1) ions, the total concentration of the metal (M1) ions may be 0.1 M to 5 M, or in another embodiment of the invention, may be 0.5 M to 2.5 M.

By treating the organic film with the aqueous solution containing metal (M1) ions, a hydrogen ion of the acid group of the organic film is replaced with a metal (M1) ion. Specifically, a hydrogen ion of an acid group, such as $-SO_3H$, of the organic film is directly replaced with a metal (M1) ion, so that the acid group turns into a metal salt such as $-SO_3M1$. It is noted that M1 indicates metal atoms of the metal (M1) ions (same applies below).

The treatment is not to be particularly limited in condition so long as an acid group turns into a metal salt, and as such, the treatment is carried out at a temperature of normally 0° C. to 80° C., or 20° C. to 50° C., for a treating time (dipping time) of normally one minute to thirty minutes, preferably five minutes to fifteen minutes.

Also when the addition-polymerizable compound having an acidic group has an ester group, the acidic group can be turned into a metal (M1) salt by treating the organic film with the aqueous solution containing metal (M1) ions, as in the case described above. Alternatively, the acidic group can also be turned into a metal (M1) salt by forming an acidic group through hydrolysis of an ester bond by treatment of the organic film with an acid aqueous solution and then treating the acidic group with the aqueous solution containing metal (M1) ions.

Usable examples of the "acid aqueous solution" include an aqueous solution of hydrochloric acid, an aqueous solution of sulfuric acid, an aqueous solution of nitric acid, an aqueous solution of acetic acid, etc., and the treatment with the acid aqueous solution can be easily implemented, for example, by dipping the substrate or film formed with the organic film in the acid aqueous solution. The acid concentration is for example 0.1 M to 10 M, or 0.5 M to 5M. The treatment is carried out, for example, at a temperature of 0° C. to 80° C., or 20° C. to 50° C. The treating time with (dipping time in) the acid aqueous solution is for example one minute to thirty minutes, or five minutes to fifteen minutes.

(1-3. Metal Fixing Step)

The metal fixing step is a step of turning the metal (M1) salt into a metal (M2) salt by further treating the organic film with a metal (M2) ion aqueous solution containing metal (M2) ions that are lower in ionization tendency than the metal (M1) ions.

The metal fixing step can be easily implemented, for example, by dipping the substrate or film formed with the organic film, which has been treated with the aqueous solution containing metal (M1) ions, in the metal (M2) ion aqueous solution containing metal (M2) ions or by applying the metal (M2) ion aqueous solution containing metal (M2) ions to the substrate or film formed with the organic film, which has been treated with the aqueous solution containing metal (M1) ions.

Because the metal (M2) ions are lower in ionization tendency than the metal (M1) ions, the metal (M1) salt of the organic film is easily cation-exchanged with a metal (M2) ion, so that the metal (M2) ions are introduced and fixed onto the organic film.

The metal (M2) is not to be particularly limited so long as it is a metal capable of such cation exchange, and may be tin, nickel, indium, gold, palladium, or silver. It is possible to use one of these metals alone or two or more of them in combination.

Because, as described above, the method of fabrication according to one or more embodiments of the present invention uses the primer composition containing the addition-polymerizable compound having three or more reactive groups, which has a bulky structure, the addition-polymerizable compound having an acidic group, which is excellent in ability to carry metal ions, and the addition-polymerizable compound having a hydrophilic functional group, films of various types of metal can be formed satisfactorily. Therefore, a half mirror can be provided which utilizes the respective characteristic colors of metals to exhibit various appearances.

Furthermore, the metal film can be directly formed without use of a catalyst.

The metal (M2) ion aqueous solution is not to be particularly limited, but possible examples include an aqueous solution of tin chloride (II), an aqueous solution of tin chloride (IV), an aqueous solution of tin sulfide (II), an aqueous solution of tin acetate (II and IV), an aqueous solution of nickel chloride, an aqueous solution of nickel nitride, an aqueous solution of nickel sulfide, an aqueous solution of nickel acetate, an aqueous solution of indium chloride, an aqueous solution of indium nitride, an aqueous solution of indium acetate, an aqueous solution of indium sulfide, an aqueous solution of gold chloride (III), an aqueous solution of gold chloride (I), an aqueous solution of chlorauric acid, an aqueous solution of gold acetate, an aqueous solution of palladium chloride (II), an aqueous solution of palladium bromide (II), an aqueous solution of palladium nitride (II), an aqueous solution of palladium sulfide (II), an aqueous solution of palladium acetate (II), an aqueous solution of silver nitride, an aqueous solution of silver acetate, an aqueous solution of solver carbonate, an aqueous solution of silver chloride, etc.

The concentration of the metal (M2) ions in the aqueous solution is not to be particularly limited so long as cation exchange is achieved, and may be, for example, 5 mM to 500 mM, or 30 mM to 250 mM. It is noted that one or more embodiments of the present invention is not intended to discourage use of two or more types of metal (M2) ions, and in the case of use of two or more types of metal (M2) ions, the total concentration of the metal (M2) ions may be 5 mM to 500 mM, or 30 mM to 250 mM.

The treatment is carried out, for example, at a temperature of 0° C. to 80° C., or 20° C. to 50° C., although such a temperature is not to be particularly limited so long as cation exchange is achieved. The treating time (dipping time) is for example one minute to thirty minutes, or five minutes to fifteen minutes, although it is not to be particularly limited so long as cation exchange is achieved.

(1-4. Reducing Step)

The reducing step is a step of reducing the metal (M2) ions to form a metal film on a surface of the organic film. That is, the reducing step is a step of reducing the metal (M2) ions introduced onto the organic film in the metal fixing step, thereby depositing metal atoms of the ions on the surface of the organic film to form a predetermined metal film.

Examples of methods of reduction include methods, etc. that are carried out with use of (i) one or more reducing agents selected from the group consisting of (1) ascorbic acid, sodium ascorbate, sodium borohydride, potassium borohydride, dimethylamine borane, trimethylamine borane, citric acid, sodium citrate, tannic acid, diborane, hydrazine, and formaldehyde, (2) derivatives of the compounds (I), and (3) a sulfite salt and hypophosphite and/or (ii) one or more reducing means selected from the group consisting of ultraviolet rays, heat, plasma, and hydrogen.

The derivatives are not to be particularly limited, nor are (3) a sulfite salt and hypophosphite to be particularly limited.

For example, in a method in which a reducing agent is used, the metal (M2) ions can be reduced by bringing the surface of the organic film and the reducing agent into contact. The reducing agent is normally used in the form of an aqueous solution, and the reduction can be easily achieved by dipping the substrate or film having the organic film in the aqueous solution of the reducing agent.

The concentration of the reducing agent in the aqueous solution is not to be particularly limited. However, in the case of too low a concentration of the reducing agent, the reductive reaction tends to decelerate too much. In the case of too high a concentration of the reducing agent, the deposited metal may unfavorably drop off.

Therefore, the concentration of the reducing agent may be 1 mM to 500 mM, or 5 mM to 100 mM. The temperature of treatment during the reduction is not to be particularly limited, but the temperature of the aqueous solution of the reducing agent may be for example 0° C. to 80° C., or 20° C. to 50° C. Further, the treating time (dipping time) is not to be particularly limited, but may be for example one minute to thirty minutes, or five minutes to fifteen minutes.

Alternatively, in a method in which reduction is carried out with use of ultraviolet rays, it is only necessary to irradiate the surface of the organic film with ultraviolet rays. For example, in the case of use of a UV irradiation apparatus PL16-110 manufactured by SEN LIGHTS Co., Ltd., the irradiation time may be ten minutes to 150 minutes, or sixty minutes to ninety minutes. In cases where reduction is carried out by such a method, through ultraviolet irradiation with a mask, an organic film having a pattern shape corresponding to the mask can be formed. Therefore, even a comparatively complex metal pattern can be easily formed. A region other than the pattern portion can be removed, for example, through dip coating in a 1% aqueous solution of nitric acid or the like.

In a method of reduction by heat (heating), it is only necessary to reduce the metal (M2) ions with use of an apparatus that can be heated such as a hot plate or an oven. The heating temperature may be 150° C. to 300° C., and the heating time may be five minutes to sixty minutes.

In the reducing step, the reduction may be carried out with use of a combination of (i) one or more reducing agents selected from the group consisting of (1) to (3) above and (ii) one or more reducing means selected from the group consisting of ultraviolet rays, heat, plasma, and hydrogen.

After completion of the reduction, the substrate or film is normally cleaned and then dried. The substrate or film may be washed with water. However, in the case of use of a reducing agent, the substrate or film may be washed with an aqueous solution of sulfuric acid, in order that extra metal ions are surely removed. The substrate or film may be dried by leaving it at room temperature. However, the substrate or film may be dried in a nitrogen atmosphere, in order that the resulting metal film is prevented from being oxidized. Further, in one or more embodiments of the present invention, the substrate or film may be washed in an interval between each of the steps or treatments described above and another.

The thickness of the metal film obtained through such steps of the method of fabrication according to one or more embodiments of the present invention is not to be particularly limited, and can be controlled, for example, within a range of 10 nm to 500 nm or, in particular, 20 nm to 200 nm. It is noted that the thickness of the metal film can be controlled, for example, by varying the concentration of metal ions and the temperature and time of treatment with the metal ions and the concentration of a reducing agent and the temperature and time of treatment with the reducing agent, etc., as wells as the concentration of the KOH and the temperature and time of treatment with the KOH, and can be measured by cross-section observation, e.g., by a TEM (manufactured by Hitachi High-Technologies Corporation).

Because the primer composition has a bulky structure and excellent ability to carry ions, because the metal (M1) ions and the metal (M2) ions are excellent in cation exchangeability, because elution of the fixed metal (M2) ions can be prevented, etc., the method of fabrication according to one or more embodiments of the present invention can fix metal ions of various types of metal such as tin, nickel, indium, gold, palladium, and silver onto an organic film, thus making it possible to fabricate a half mirror that exhibits various appearances.

[2. Half Mirror]

A half mirror according to one or more embodiments of the present invention includes: a transparent substrate or transparent film; an organic film formed on the transparent substrate or transparent film; and a metal particle film formed on the organic film, the metal particle film being formed from an orderly array of metal particles having particle diameters of 10 nm to 100 nm. The particle diameters of the metal particles may be 10 nm to 100 nm, or 20 nm to 80 nm. If the particle diameters of the metal particles are in the range of 10 nm to 100 nm, a half mirror can be provided which has no unevenness or undulation on its surface, which is uniform, and which is superior in appearance.

This "organic film" refers to the organic film obtained, as described in detail above in Section [1. Method for Fabricating a Half Mirror], by applying onto a transparent substrate or transparent film a primer composition containing an addition-polymerizable compound having three or more reactive groups, an addition-polymerizable compound having an acidic group, and an addition-polymerizable compound having a hydrophilic functional group, and by then polymerizing the primer composition.

The particle diameters of the metal particles can be confirmed, for example, by a scanning electron microscope (SEM) or a transmission electron microscope (TEM).

In the case of confirmation of the metal particles with a scanning electron microscope, the metal particles can be captured as a stereoscopic three-dimensional image. Alternatively, in the case of confirmation of the metal particles with a transmission electron microscope, the metal particles can be captured as a planer two-dimensional image.

Therefore, for example, in the case of measurement based on a three-dimensional image as in the case of use of a scanning electron microscope, the term "particle diameter" as used herein can be defined as the length of the diameter of a sphere with it being assumed that the metal particle internally touches the sphere. Alternatively, for example, in the case of measurement based on a two-dimensional image as in the case of use of a transmission electron microscope, the term "particle diameter" as used herein can be defined as the length of the diameter of a circle with it being assumed that the metal particle internally touches the circle.

In the case of confirmation of the metal particles with a scanning electron microscope, the "length of the diameter of a sphere" can be measured by comparison with the internal scale. Alternatively, in the case of confirmation of the metal particles with a transmission electron microscope, the "length of the diameter of a circle" can be similarly measured by comparison with the internal scale.

Further, the metal particles are not particularly limited, but may be tin, nickel, indium, gold, palladium, or silver. It is possible to use one of these metals alone or two or more of them in combination.

Furthermore, warpage of the half mirror according to one or more embodiments of the present invention is not to be particularly limited, but may be 20 μm or less. If the warpage of the half mirror is 20 μm or less, the half mirror can be superior in appearance.

The term "warpage of a half mirror" here means warpage having occurred in the substrate during the step of fabricating the half mirror, and can be calculated according to calculating formula (1) as follows:

$$\text{Warpage of Half Mirror (μm)} = (\text{Amount of Warpage of Half Mirror after Fabrication}) - (\text{Amount of Warpage of Substrate before Fabrication}) \quad (1)$$

That is, the term "warpage of a half mirror" means the difference between the maximum distance from a straight line connecting both ends of the transparent substrate or transparent film to the transparent substrate or transparent film in an x-z cross-section of the transparent substrate or transparent film before the fabrication of the half mirror and the maximum distance from a straight line connecting both ends of the half mirror to the half mirror in an x-z cross-section of the half mirror.

Figure 1:
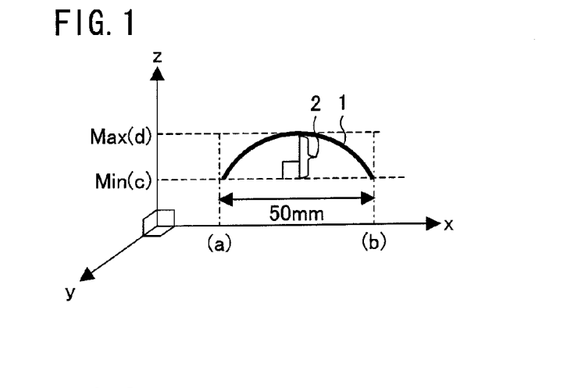
FIG. 1 is a conceptual diagram representing the definition of the amount of warpage of a half mirror according to one or more embodiments of the present invention.

In the following, the term "warpage of a half mirror" is explained with reference to FIG. 1. FIG. 1 is a diagram representing the definition of the amount of warpage of a half mirror. In FIG. 1, reference numeral 1 indicates a half mirror, and reference numeral 2 indicates the maximum distance from a straight line connecting both ends of the half mirror to the half mirror. That is, the "distance" is the length of a perpendicular line drawn from the straight line connecting both ends of the transparent substrate or transparent film to the transparent substrate or transparent film along the z axis or the length of a perpendicular line drawn from the straight line connecting both ends of the half mirror to the half mirror along the z axis.

As shown in FIG. 1, "Amount of Warpage of Half Mirror after Fabrication" in calculating formula (1) can be calculated, for example, by setting a measuring region so that the length of a straight line (ab) connecting both ends of the half mirror in the x-z cross-section is 50 mm and calculating the maximum distance from the straight line (ab) to the half mirror in the measuring region according to calculating formula (2) as follows:

$$\text{Amount of Warpage of Half Mirror after Fabrication (μm)} = \text{Maximum Value on Z-coordinate } (d) - \text{Minimum Value on Z-coordinate } (c) \quad (2)$$

The amount of warpage of the substrate before fabrication can be calculated in the same manner.

It is noted that the "half mirror after fabrication" means the half mirror after the reducing step of reducing the metal (M2) ions to form a metal film on a surface of the organic film, and the "substrate before fabrication" means the transparent substrate or transparent film before application of the primer composition from which the organic film is formed.

The half mirror according to one or more embodiments of the present invention may have a total transmittance of 10% to 80%, or in another embodiment may be 30% to 70%.

The term "total transmittance of a half mirror" here means the proportion of the intensity of transmitted light to the intensity of total incident light. The total transmittance can be measured by a hazemeter.

Half mirrors fabricated by the method of fabrication according to one or more embodiments of the present invention can be used for various electronic parts such as various (e.g., liquid crystal) display panels and electronic devices such as cellular phones, timepieces, cameras, game machines, audio equipment, VCRs, DVD recorders, HDD recorders, car navigation systems, personal computers, television sets, washing machines, microwave ovens, and health appliances.

The present invention is not limited to the description of the embodiments above, but may be altered by a skilled person within the scope of the claims. An embodiment based on a proper combination of technical means disclosed in different embodiments is encompassed in the technical scope of the present invention.

EXAMPLES

The present invention is described in more detail below with reference to Examples; however, the present invention is not to be limited to these Examples.

[Fabrication of a Half Mirror of Comparative Example]

A half mirror of Comparative Example was fabricated by the thermal transfer method, which is a conventional publicly-known method. First, a Sn film having a thickness of 50 nm was formed on a polyester film by an evaporation method to serve as a metal transfer film. After that, the metal transfer film was placed on a poly(methylmethacrylate) (PMMA) substrate having a thickness of 2 mm, and thermal transfer was carried out at 130° C., whereby the Sn film was transferred onto the PMMA substrate. Furthermore, aging was carried out at 85° C. for ten minutes, whereby the Sn film was formed on a surface of the PMMA substrate.

Example 1

Fabrication of a Half Mirror Excellent in Appearance

[Fabrication of a Half Mirror of Example 1]

A half mirror of Example 1 was fabricated through Steps 1 and 2 as follows:

(Step 1: Preparation of a Primer Composition and Formation of a UV Cured Resin Film)

TABLE 1

|  | wt % |
|---|---|
| Polymerization initiator (marketed as Lucirin TPO; manufactured by BASF | 1 |
| Phthalic acrylate (marketed as HOA-MPL; manufactured by KYOEISHA CHEMICAL Co., Ltd.) | 69 |
| Pentaerythritol triacrylate (marketed as PE-3A; manufactured by KYOEISHA CHEMICAL Co., Ltd.) | 15 |
| Ethylene glycol diacrylate (marketed as 4EG-A; manufactured by KYOEISHA CHEMICAL Co., Ltd.) | 15 |

As a primer composition, a chemical was prepared by mixing the compounds of Table 1 so that the total is 100% by weight, and the chemical was applied onto a PMMA substrate by spin coating. After that, a high-pressure mercury vapor lamp (PL16-110; manufactured by SEN LIGHTS Co., Ltd.) was used to irradiate the PMMA substrate with ultraviolet (UV) rays at 20 mW/cm$^2$ for five minutes, whereby a UV cured resin film having a film thickness (F.T.) of 5.0 μm was formed.

As a radical polymerization initiator, 2,4,6-trimethylbenzoyl-diphenyl-phosphine oxide (marketed as Lucirin TPO, manufactured by BASF) was used. As an addition-poymerizable compound having an acidic group, phthalic acrylate (marketed as HOA-MPL; manufactured by KYOEISHA CHEMICAL Co., Ltd.) was used. As an addition-polymerizable compound having three or functional groups, pentaerythritol triacrylate (marketed as PE-3A; manufactured by KYOEISHA CHEMICAL Co., Ltd.) was used. As an addition-polymerizable compound having a hydrophilic functional group, ethylene glycol diacrylate (marketed as 4EG-A; manufactured by KYOEISHA CHEMICAL Co., Ltd.) was used.

(Step 2: Formation of a Metal Film)

A Sn film that imparts metallic luster to a resin surface was obtained by subjecting the UV cured resin film formed above in Step 1 to the following steps:

(1) Dip the UV cured resin film in a 2.5 M aqueous solution of potassium hydroxide at 40° C. and keep there for ten minutes.

(2) Wash it well in distilled water.

(3) Dip it in a 50 mM aqueous solution of SnCl$_2$ at room temperature and keep it there for ten minutes.

(4) Wash it well in distilled water.

(5) Dip it in a 100 mM aqueous solution of sodium borohydride at room temperature and keep it there for ten minutes to reduce metal ions.

(6) Wash it well in distilled water.

(7) Dry it in a nitrogen atmosphere.

[Result 1: Measurement of Warpage of the Half Mirrors]

As described in detail above in Section [2. Half Mirror], the "warpage of a half mirror" can be calculated, with reference to FIG. 1, as the difference between the maximum distance from a straight line connecting both ends of the transparent substrate or transparent film to the transparent substrate or transparent film in an x-z cross-section of the transparent substrate or transparent film before the fabrication of the half mirror and the maximum distance from a straight line connecting both ends of the half mirror to the half mirror in an x-z cross-section of the half mirror. Accordingly, a SURFCOM (manufactured by Tokyo Seimitsu Co., Ltd.) was used to measure the half mirrors fabricated in Example 1 and Comparative Example for the "maximum distance" under the following conditions. It is noted that three measurements were taken for each half mirror.

T-speed: 3.0 mm/s
LENGTH: 50.0 mm
Cutoff value: 0.8 mm
V-MAG: 100, H-MAG: 1
TILT COR FLAT-ML
POLARITY POSITIVE Table 2 shows results obtained from measured values of the "maximum distance" by using calculating formula (1).

TABLE 2

|  | Example 1 | Comp. Ex. |
|---|---|---|
| Warpage of substrate (μm) | 16.2 | 448.0 |
|  | 8.6 | 443.8 |
|  | 10.6 | 419.4 |
|  | avg. 11.8 | avg. 437.1 |

The average warpage of the half mirror fabricated in Comparative Example was 437.1 μm. On the other hand, the average warpage of the half mirror fabricated in Example 1 was 11.8 μm. This clearly shows that a half mirror fabricated by the method according to one or more embodiments of the present invention has almost no "warpage".

[Result 2: Comparison of Appearance between the Half Mirrors]

Figure 2:
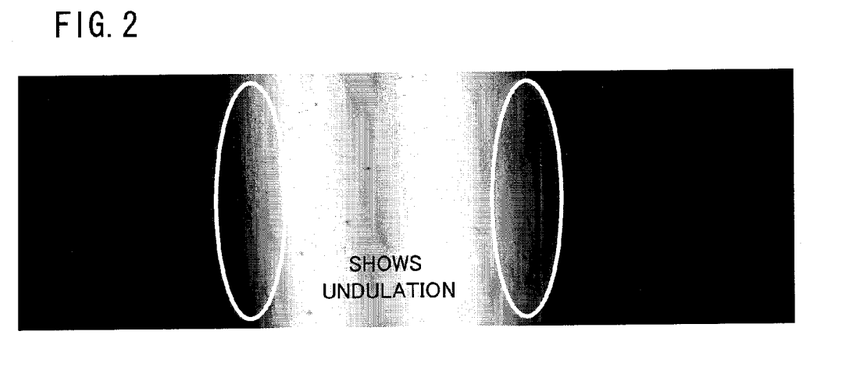
FIG. 2 is a digital photograph showing the appearance of a half mirror fabricated by the thermal transfer method in Comparative Example according to one or more embodiments of the present invention.
Figure 3:
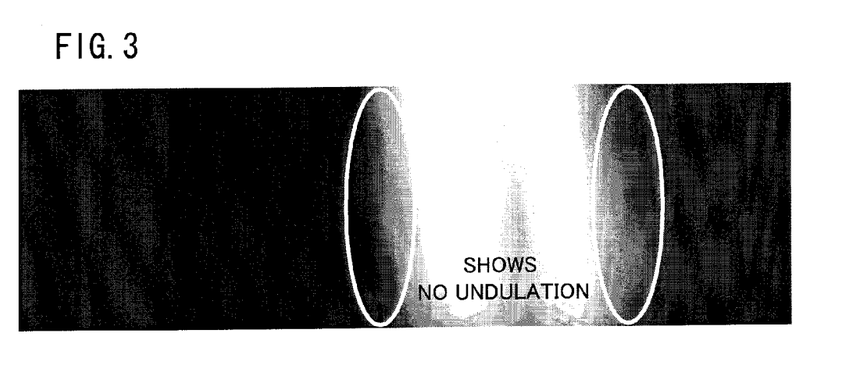
FIG. 3 is a digital photograph showing the appearance of a half mirror fabricated in Example 1 according to one or more embodiments of the present invention.

A digital camera was used to take photographs of the surfaces of the half mirrors with a magnification of ×4. FIG. 2 shows a photograph of the appearance of the half mirror fabricated in Comparative Example, and FIG. 3 shows a photograph of the appearance of the half mirror fabricated in Example 1.

The half mirror of Comparative Example fabricated by the thermal transfer method shows undulation and pin holes on its surface. Furthermore, as shown in FIG. 2, the half mirrors had streaks extending up and down on its surface, thus impairing its appearance. On the other hand, the half mirror of one or more embodiments of the present invention did not show undulation, pin holes, or the like on its surface, as shown in FIG. 3.

Figure 4:
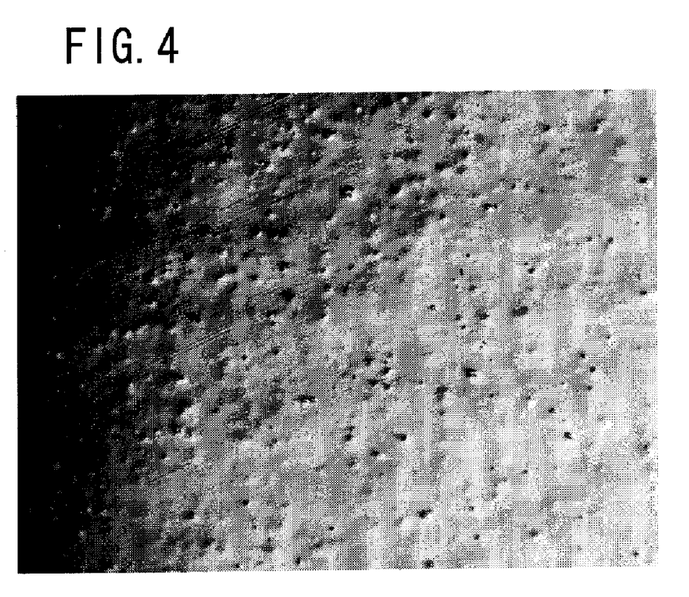
FIG. 4 is a metallurgical micrograph showing the appearance of the half mirror fabricated by the thermal transfer method in Comparative Example according to one or more embodiments of the present invention.

Furthermore, a metallurgical microscope (BX60M; manufactured by Nikon Corporation) was used to take photographs of the surfaces of the half mirror with a magnification of ×50 in a bright field. FIG. 4 shows a photograph of the appearance of the half mirror fabricated in Comparative Example, and FIG. 5 shows a photograph of the appearance of the half mirror fabricated in Example 1.

While the half mirror of Comparative Example formed by the thermal transfer method shows minor unevenness and undulation on its surface, the half mirror fabricated in Example 1 of one or more embodiments of the present invention was found to be free of minor unevenness and undulation on its surface and, thus, to have a uniform appearance with an orderly array of metal particles.

Figure 5:
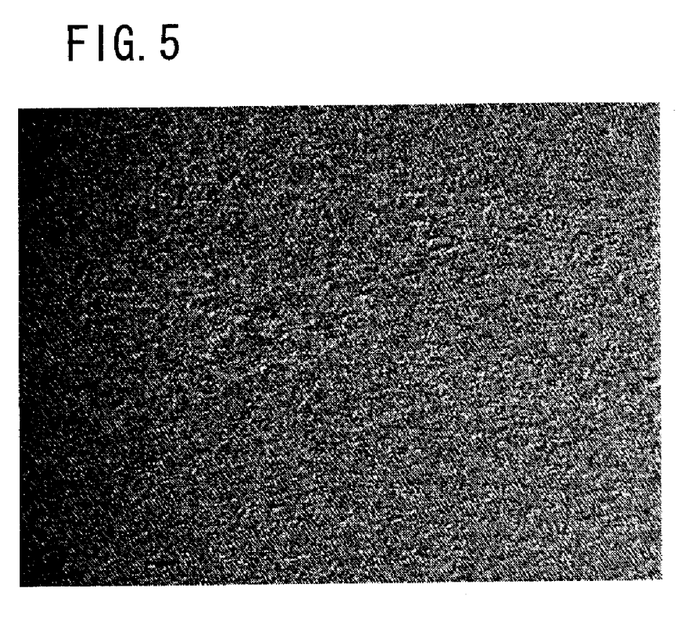
FIG. 5 is a metallurgical micrograph showing the appearance of the half mirror fabricated in Example 1 according to one or more embodiments of the present invention.

It is noted that a scanning electron microscope (S-4700; manufactured by Hitachi High-Technologies Corporation) was used to measure the particle diameters of the metal particles with reference to the length of an internal scale, whereby it was found that the particle diameters of the metal particles shown in FIG. 5 are 30 nm to 60 nm.

[Result 3: Measurement of the Total Transmittances of the Half Mirrors]

A hazemeter (NDH-5000; manufactured by Nippon Denshoku Industries Co., Ltd.) to measure the total transmittances of the half mirrors. The half mirror fabricated in Comparative Example has a total transmittance of 28%, and the half mirror fabricated in Example 1 has a total transmittance of 30%. It was found that the half mirror fabricated in Example 1 has a function as a half mirror as with the half mirror of Comparative Example fabricated by the thermal transfer method, which is a conventional publicly-known method.

Example 2

Fabrication of a Half Mirror Having a Pattern of Characters or Pictures

Figure 6:
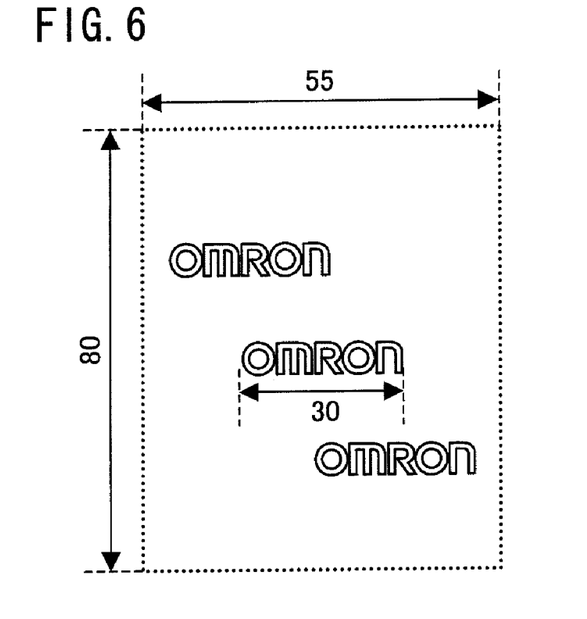
FIG. 6 is a schematic view of a stamper used in Example 2 according to one or more embodiments of the present invention.
Figure 7:
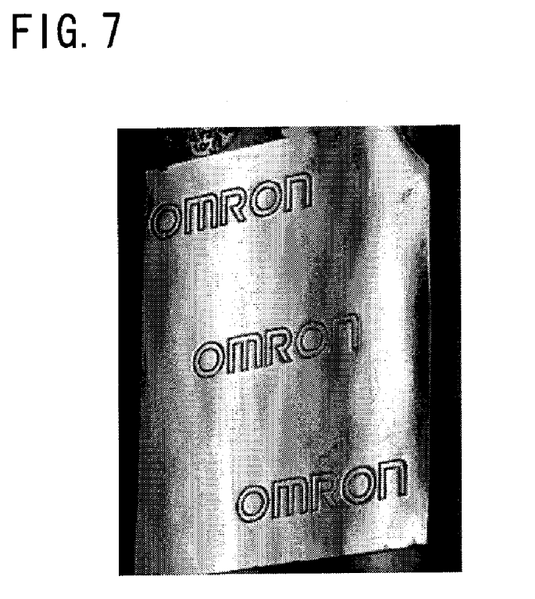
FIG. 7 is a digital photograph showing the appearance of a half mirror fabricated in Example 2 according to one or more embodiments of the present invention.

A half mirror having a logo "OMRON" on its surface was fabricated through the same process as Steps 1 and 2 of Example 1, except that after the chemical mixture serving as the primer composition had been applied onto a PMMA substrate, the design was transferred onto UV cure resin by placing a stamper shown in FIG. 6 on the coated surface by imprinting and, then, by curing the UV cure resin through UV irradiation. FIG. 7 shows a digital photograph of the half mirror thus fabricated. It is noted that FIG. 6 shows numerical values in units of mm.

As shown in FIG. 7, the half mirror was able to be easily decorated with a design of characters simply by using a stamper formed with the characters by combining flat parts and raised and depressed parts. The conventional method of Patent Literature 1, in which ink is printed on a half mirror surface, has such a defect that the ink peels off by friction such as finger rubbing. On the other hand, the characters given by the method of Example 2 are expressed by raised and depressed parts on an organic film, and the organic film has a metal surface formed on its surface. This makes it possible to easily fabricate a half mirror which does no impair its appearance due to peeling by friction, which is excellent in design, and whose design does not peel off.

Further, the total transmittance of the half mirror fabricated in Example 2 was measured in the same manner as in Example 1. The half mirror was found to have a total transmittance of 30% and, thus, to have a function as a half mirror even when decorated with a design.

Example 3

Fabrication of a Half Mirror Containing a Composite Metal

A half mirror including a metal particle film composed of two types of metal, namely Sn and Ni, was fabricated through the same process as Steps 1 and 2 of Example 1, except for the use of an aqueous solution containing 50 mM $SnCl_2$ and 50 mM $NiCl_2$ instead of the 50 mM aqueous solution of $SnCl_2$ named in (3) of Step 2 of Example 1. The half mirror thus fabricated exhibited a thick, deep, and sophisticated metallic color in comparison with the appearance of a half mirror including a metal particle film composed of a single metal Sn or Ni. The method for fabricating a half mirror according to one or more embodiments of the present invention makes it possible to easily fabricate a half mirror having various metallic colors that were not able to be expressed by a single metal alone.

Further, the total transmittance of the half mirror fabricated in Example 3 was measured in the same manner as in Example 1. The half mirror was found to have a total transmittance of 25% and, thus, to have a function as a half mirror even when it includes a metal particle film composed of a plurality of metals.

INDUSTRIAL APPLICABILITY

Because, as described above, one or more embodiments of the present invention has realized a method capable of easily and inexpensively fabricating half mirrors that are less in warpage than and superior in substrate selectivity and design to conventional counterparts, half mirrors of one or more embodiments of the present invention can be used as signs of various types of electronic device, display panels, labels, etc., and, as such, can be widely used in various fields of electronics industry.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

| Reference Signs List | |
| --- | --- |
| 1 | Half mirror |
| 2 | Maximum distance |

The invention claimed is:

1. A method for fabricating a half mirror, the method comprising the steps of:
   (a) forming an organic film by applying onto a transparent substrate or transparent film a primer composition containing an addition-polymerizable compound having three or more reactive groups, an addition-polymerizable compound having an acidic group, and an addition-polymerizable compound having a hydrophilic functional group, and by then polymerizing the primer composition;

(b) turning the acidic group into a metal (M1) salt by treating the organic film with an aqueous solution containing metal (M1) ions; (c) turning the metal (M1) salt into a metal (M2) salt by further treating the organic film with a metal (M2) ion aqueous solution containing metal (M2) ions that are lower in ionization tendency than the metal (M1) ions; and (d) reducing the metal (M2) ions to form a metal film on a surface of the organic film, wherein the organic film is given raised and depressed parts by applying the primer composition onto the transparent substrate or transparent film by printing or imprinting.

2. The method as set forth in claim 1, wherein the acidic group includes a functional group selected from the group consisting of a carboxyl group, a sulfonic acid group, a phenol group, a benzoic acid group, a phthalic acid group, a salicylic acid group, an acetylsalicylic acid group, and a benzenesulfonic acid group.

3. The method as set forth in claim 1, wherein the reactive groups of the addition-polymerizable compound having three or more reactive groups include acryloyl groups and/or methacryloyl groups.

4. The method as set forth in claim 1, wherein the hydrophilic functional group includes an ethylene oxide group and/or a propylene oxide group.

5. The method as set forth in claim 1, wherein the metal (M1) is potassium or sodium.

6. The method as set forth in claim 1, wherein the metal (M2) is one or more types of metal selected from the group consisting of tin, nickel, indium, gold, palladium, and silver.

7. The method as set forth in claim 1, wherein in the step (d), the metal (M2) ions are reduced with use of (i) one or more reducing agents selected from the group consisting of (1) ascorbic acid, sodium ascorbate, sodium borohydride, potassium borohydride, dimethylamine borane, trimethylamine borane, citric acid, sodium citrate, tannic acid, diborane, hydrazine, and formaldehyde, (2) derivatives of the compounds (I), and (3) a sulfite salt and hypophosphite and/or (ii) one or more reducing means selected from the group consisting of ultraviolet rays, heat, plasma, and hydrogen.

* * * * *